Patented Oct. 19, 1948

2,451,610

UNITED STATES PATENT OFFICE 2,451,610

PREPARATION OF 4-ALKYL-QUINOLINES

Kenneth Nielsen Campbell, South Bend, Ind., assignor to E. I. du Pont de Nemours & Company, Wilmington, Del., a corporation of Delaware No Drawing. Application August 9, 1944, Serial No. 548,787

7 Claims. (Cl. 260—283)

This invention relates to an improved method for preparing 4-alkyl-quinolines, such as lepidine and related compounds which are useful as intermediates in the synthesis of pharmaceuticals.

It is an object of this invention to provide an improved process for synthesizing 4-alkyl-quinolines from arylamines and alkyl-vinyl-ketones, whereby to obtain the desired compound in improved yield. Other and further important objects of this invention will appear as the description proceeds.

The synthesis of a 4-alkyl-quinoline by the aid of an alkyl-vinyl-ketone was first described by Blaise and Maire, Bull. Soc. Chim. (4), vol. 3, p. 658 (1908). The authors first reacted aniline with an alkyl-vinyl-ketone to produce a beta-anilino-alkyl-ketone; the latter was then heated with aniline-hydrochloride and alcohol to produce the corresponding 4-alkyl-quinoline. The synthesis may be expressed by the following two equations, wherein Alk stands for an alkyl radical:

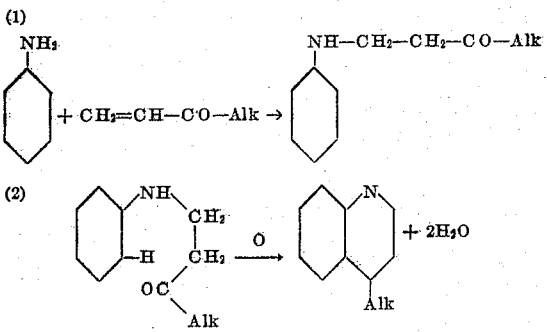

It is clear that an oxidizing agent must be employed in the second step of the process. In the reaction of the above authors, presumably contact with the atmosphere was depended upon to supply the requisite oxygen. The above authors have applied the process to the synthesis of 4-ethyl and 4-propyl quinolines. They have apparently not applied it to the synthesis of 4-methyl-quinolines.

No yields were mentioned in the above publication, but various other contemporary methods described in the literature, using for instance aniline and a mixture of an aldehyde and a ketone, gave very poor yields. It was not until 1931 that a method was described giving yields of the order of 43 to 58% of theory, and this one was based on the use of aniline and a beta-chloroethyl-ketone (U. S. P. 1,804,045).

I have now found that 4-alkyl-quinolines, especially 4-methyl-quinoline (lepidine), may be synthesized from an arylamine and an alkyl-vinyl-ketone in a single step and with exceptionally good yields, if one starts with the hydrochloride of the desired arylamine, and if the reaction mass contains ferric chloride as an oxidizing agent. The reaction is preferably carried out in alcohol as a solvent, which may be 95% alcohol, and may contain further free aniline and a condensing agent, such as zinc chloride. The yields obtained by the improved process are of the order of 48 to 72% of theory.

Without limiting my invention, the following examples, in which parts mentioned are by weight, will serve to illustrate my preferred mode of operation.

*Example 1.—Lepidine (4-methyl-quinoline) from methyl-vinyl-ketone*

80.9 parts of aniline hydrochloride (0.625 mole), 270 parts of (1.0 mole) of ferric chloride hexahydrate, 10 parts of anhydrous zinc chloride, and 365 parts of 95% ethyl alcohol are charged into a vessel equipped with a reflux condenser. The mixture is heated to an inside temperature of 55°–75° C., and 35.0 parts (0.5 mole) of freshly distilled methyl-vinyl-ketone are added slowly over a period of 1 to 1.5 hours. The solution is then refluxed for 1.5 to 2 hours, and allowed to stand overnight. The alcohol is removed by distillation until 320–340 parts are collected, and 150 parts of water are added to the residue. The mixture is stirred and cooled, and made strongly basic by the addition of strong sodium hydroxide solution (25–40%), while the temperature is kept below 25° C. The mixture is concentrated by distillation, and is then heated in an oil bath at 225–250° C., while superheated steam at 225–250° C. is passed in. The organic layer in the distillate is separated; the aqueous layer is saturated with salt and extracted twice with ether. The extracts and organic layer are combined and dried over magnesium sulfate. The ether is removed by distillation and the residue is fractionally distilled. The yield of lepidine is 52.7 parts, which is equivalent to 73% of the theoretical;

B. P.=90–95°/1.5–2 mm.

$n_D^{20}=1.6185–1.6195$; $d_4^{20}=1.0826$.

Steam at 100° C. can be used in the above procedure for the isolation of the lepidine, but under these conditions a much larger volume of distillate is collected.

Example 2.—4,6-dimethylquinoline from methyl-vinyl-ketone

The procedure is the same as described under Example 1, the following reagents and amounts being used: 44.7 parts (0.313 mole) of p-toluidine hydrochloride, 135 parts (0.5 mole) of ferric chloride hexahydrate, 5 parts of anhydrous zinc chloride, 182 parts of 95% ethyl alcohol and 17.5 parts (0.25 mole) of methyl-vinyl-ketone. The yield of 4,6-dimethylquinoline is 65% of the theoretical; B. P.=103–106°/2.5 mm.; $n_D^{20}$=1.6080–1.6095; $d_4^{20}$=1.0577.

Example 3.—2,4-dimethylquinoline from 3-penten-2-one

The procedure is the same as described above, the following reagents and quantities being used: 40.4 parts (0.313 mole) of aniline hydrochloride, 135 parts (0.5 mole) of ferric chloride hexahydrate, 5 parts of anhydrous zinc chloride, 182 parts of 95% ethyl alcohol, and 21.0 parts (0.25 mole) of 3-penten-2-one. The yield of 2,4-dimethylquinoline is 24.2 parts or 62% of the theoretical; B. P.=104.5–105.5°/4 mm.; $n_D^{20}$=1.6075–1.6069; $d_4^{20}$=1.0549.

Example 4.—6-methoxylepidine from methyl-vinyl-ketone

A mixture of 99.6 parts (0.625 mole) of p-anisidine hydrochloride, 270 parts (1.0 mole) of ferric chloride hexahydrate, 10 parts of anhydrous zinc chloride, and 365 parts of 95% ethyl alcohol were treated at 60° C. (inside temperature) with 35.0 parts (0.5 mole) of methyl-vinyl-ketone. The product was isolated as described above with superheated steam at 225–250° C. Fractionation of the ether extracts and organic layer of the steam distillate yielded a lower-boiling fraction (B. P. 93–95°/2 mm.), which was shown to be p-anisidine, and a higher boiling fraction (B. P.=121–123°/2 mm., M. P. 28°–32° C.), which is 6-methoxylepidine. The yield of the latter was 52% of the theoretical. The 6-methoxylepidine so obtained is the anhydrous form. It can be converted to the stable, crystalline hydrate, M. P. 50–52° C. by treatment with water or dilute aqueous alcohol.

Example 5.—Miscellaneous

By following the procedure of the above examples, the following additional combinations of reagents and quantities were studied. The yields are given in % of the theoretical, based on the methyl-vinyl-ketone used.

| Solvent | Aniline | Aniline hydrochloride | Methyl-vinyl-ketone | Oxidizing Agent | Condensing Agent | Yield of Lepidine |
|---|---|---|---|---|---|---|
| | Moles | Moles | Moles | | | Percent |
| Abs. alcohol | 1 | 0.5 | 0.5 | $FeCl_3 \cdot 6H_2O$ | None | 48 |
| Do | 1 | 0.5 | 0.5 | $FeCl_3$ anhydrous | do | 55 |
| 95% alcohol | 1 | 0.5 | 0.5 | $FeCl_3 \cdot 6H_2O$ | do | 62 |
| Abs. alcohol | 0 | .625 | 0.5 | do | do | 69 |
| 95% alcohol | 0 | .625 | 0.5 | do | do | 65 |
| Do | 0 | .625 | 0.5 | do | $ZnCl_2$ | 72 |

It will be noted from the above table that while the use of a mixture of aniline hydrochloride and aniline gives very good yields, better results are obtained by using the hydrochloride alone in moderate excess (about 25% excess). Also, addition of a condensing agent, such as zinc chloride has a beneficial effect. The ferric chloride may be in the form of a hydrate or anhydrous. The alcohol may be absolute or 95%, and methyl as well as ethyl.

Similar experiments using various other oxidizing agents, such as nitrobenzene, naphthalene, p-nitrophenol and arsenic acid gave very poor yields, which were in fact no better than using no oxidizing agent at all. Thus, it appears that ferric chloride is specific in the above reaction, which fact was not to be predicted on the basis of the behavior of other oxidizing agents.

In the above discussion I have mentioned the optional addition of a condensing agent such as zinc chloride. Other equivalent condensing agents are boron trifluoride or an excess of ferric chloride. As will be seen from the above examples, the condensing agent need be employed in catalytic quantities only (less than 0.2 mole per mole of alkyl-vinyl-ketone), while the oxidizing agent is to be employed in substantially stoichiometric proportions (2 moles of ferric chloride per mole of the ketone).

In lieu of the hydrochloride of the arylamine, the corresponding hydrobromide may be employed. The arylamine may bear inert substituents in the aryl ring, such as alkyl, alkoxy, halogen and benzo. In the last-mentioned case a 4-alkyl-naphthoquinoline results from the process.

Many other variations in the details of procedure may be made, within the skill of those engaged in the art, without departing from the spirit of this invention.

I claim:

1. The process of preparing a 4-alkyl-quinoline which comprises reacting a hydrogen halide of a primary arylamine having at least one free ortho-position with an alkyl-vinyl-ketone in the presence of ferric chloride as an oxidizing agent.

2. The process of preparing a 4-alkyl-quinoline which comprises reacting a hydrogen halide of a primary arylamine having at least one free ortho-position with an alkyl-vinyl-ketone in an alcoholic medium and in the presence of ferric chloride.

3. The process of preparing a 4-alkyl-quinoline which comprises reacting a hydrogen halide of a primary arylamine having at least one free ortho-position with an alkyl-vinyl-ketone in 95% alcohol, in the presence of a stoichiometric quantity of ferric chloride to serve as an oxidizing agent and in the further presence of a catalytic quantity of a condensing agent comprising zinc chloride.

4. The process of preparing lepidine, which comprises condensing about 1.25 moles of aniline hydrochloride with about 1 mole methyl-vinyl-ketone in alcohol of 95 to 100% strength and in the presence of about 2 moles of ferric chloride as oxidizing agent.

5. The process of preparing lepidine which comprises condensing about 1.25 moles of aniline hydrochloride with about 1 mole methyl-vinyl-ketone in alcohol of 95 to 100% strength and in the presence of about 2 moles of ferric chloride and less than 0.2 mole of zinc chloride.

6. The process of preparing 6-methoxylepidine which comprises condensing about 1.25 moles of p-anisidine hydrochloride with about 1 mole methyl-vinyl-ketone in alcohol of 95 to 100% strength and in the presence of about 2 moles of ferric chloride as oxidizing agent.

7. The process of preparing 6-methoxylepidine which comprises condensing about 1.25 moles of p-anisidine hydrochloride with about 1 mole methyl-vinyl-ketone in alcohol of 95 to 100% strength and in the presence of about 2 moles of ferric chloride and less than 0.2 mole of zinc chloride.

KENNETH NIELSEN CAMPBELL.

REFERENCES CITED

The following references are of record in the file of this patent:

UNITED STATES PATENTS

| Number | Name | Date |
|---|---|---|
| 1,804,045 | Zollner | May 5, 1931 |

FOREIGN PATENTS

| Number | Country | Date |
|---|---|---|
| 548,349 | Great Britain | Oct. 2, 1942 |

OTHER REFERENCES

Blaise et al., Bul. Soc. Chim. de France (4th Series), vol. 3, pages 658–674 (1908).

Kinner et al., Berichte, vol. 69-B, pages 16–18 (1936).